(12) United States Patent
Albero et al.

(10) Patent No.: US 12,299,155 B2
(45) Date of Patent: May 13, 2025

(54) PERFORMING RETROACTIVE THRESHOLD REDUCTION CONTROL REVIEW USING ARTIFICIAL INTELLIGENCE

(71) Applicant: Bank of America Corporation, Charlotte, NC (US)

(72) Inventors: George Albero, Charlotte, NC (US); Olga Kocharyan, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 558 days.

(21) Appl. No.: 17/697,157

(22) Filed: Mar. 17, 2022

(65) Prior Publication Data
US 2023/0297707 A1 Sep. 21, 2023

(51) Int. Cl.
| | |
|---|---|
| G06F 21/62 | (2013.01) |
| G06F 21/53 | (2013.01) |
| G06N 5/022 | (2023.01) |
| G06Q 10/105 | (2023.01) |

(52) U.S. Cl.
CPC .......... *G06F 21/6218* (2013.01); *G06F 21/53* (2013.01); *G06N 5/022* (2013.01); *G06Q 10/105* (2023.01); *G06F 2221/034* (2013.01)

(58) Field of Classification Search
CPC .......... G06F 21/6218; G06F 21/53; G06F 2221/034; G06N 5/022; G06N 20/00; G06Q 10/105
See application file for complete search history.

(56) References Cited

U.S. PATENT DOCUMENTS

| | | | |
|---|---|---|---|
| 8,769,684 B2 | 7/2014 | Stolfo et al. | |
| 8,868,728 B2 | 10/2014 | Margolies et al. | |
| 9,641,544 B1 * | 5/2017 | Treat | H04L 43/04 |
| 9,727,821 B2 | 8/2017 | Lin et al. | |
| 10,104,100 B1 | 10/2018 | Bogorad | |
| 10,142,391 B1 | 11/2018 | Brisebois et al. | |
| 10,270,790 B1 | 4/2019 | Jackson | |
| 10,326,748 B1 | 6/2019 | Brisebois et al. | |

(Continued)

FOREIGN PATENT DOCUMENTS

| | | | | |
|---|---|---|---|---|
| CN | 117786079 A | * | 3/2024 | G06F 16/332 |

*Primary Examiner* — Christopher A Revak
(74) *Attorney, Agent, or Firm* — Banner & Witcoff, Ltd.

(57) ABSTRACT

Aspects of the disclosure relate to adjustable control thresholds. A computing platform may monitor employee activity within an enterprise organization. The computing platform may generate, for each employee of the plurality of employees, employee control thresholds. The computing platform may generate, based on an indication from an employee computing device, modified employee control thresholds associated with the employee. The computing platform may generate, based on the indication, test data including a subset of the employee activity associated with the employee. The computing platform may analyze, within a sandbox environment, the test data, and may determine, based on the analysis, whether to: transmit a notification to an enterprise computing device indicating the test data complies with the employee control thresholds associated with the employee; or transmit a notification to the enterprise computing device indicating the test data does not comply with the employee control thresholds associated with the employee.

20 Claims, 9 Drawing Sheets

(56) References Cited

U.S. PATENT DOCUMENTS

| | | | |
|---|---|---|---|
| 10,505,825 B1* | 12/2019 | Bettaiah | H04L 43/20 |
| 10,986,121 B2 | 4/2021 | Stockdale et al. | |
| 11,050,793 B2* | 6/2021 | Jeyakumar | H04L 63/1416 |
| 11,126,467 B2 | 9/2021 | Gray et al. | |
| 11,170,029 B2 | 11/2021 | Pradjinata | |
| 11,178,509 B2 | 11/2021 | Wang et al. | |
| 11,194,915 B2 | 12/2021 | Stolfo et al. | |
| 11,200,969 B2 | 12/2021 | Lyman et al. | |
| 11,216,317 B1 | 1/2022 | Shibayama et al. | |
| 11,277,661 B2 | 3/2022 | Inoue et al. | |
| 11,757,890 B1* | 9/2023 | Kearney | G06Q 10/063116 |
| | | | 726/1 |
| 2015/0235152 A1 | 8/2015 | Eldardiry et al. | |
| 2016/0142399 A1* | 5/2016 | Pace | G06F 21/41 |
| | | | 726/4 |
| 2019/0044963 A1 | 2/2019 | Rajasekharan et al. | |
| 2019/0052659 A1* | 2/2019 | Weingarten | H04L 67/34 |
| 2019/0238604 A1 | 8/2019 | Sundaram et al. | |
| 2019/0238605 A1 | 8/2019 | Patel et al. | |
| 2019/0243967 A1* | 8/2019 | Sonoda | G06F 21/55 |
| 2019/0373031 A1 | 12/2019 | Patel et al. | |
| 2019/0385175 A1* | 12/2019 | Chamberlain | G06Q 30/0185 |
| 2020/0175152 A1* | 6/2020 | Xu | G06F 21/53 |
| 2020/0259852 A1* | 8/2020 | Wolff | H04L 67/10 |
| 2021/0084063 A1* | 3/2021 | Triantafillos | H04L 67/535 |
| 2022/0224716 A1* | 7/2022 | Salji | H04L 63/1416 |
| 2022/0294765 A1* | 9/2022 | Frendo | H04L 63/0428 |
| 2023/0177934 A1* | 6/2023 | Reddy | G06N 3/08 |
| | | | 348/143 |
| 2024/0356959 A1* | 10/2024 | Jeyakumar | G06N 3/02 |
| 2024/0406210 A1* | 12/2024 | Sellars | G06F 9/45558 |

* cited by examiner

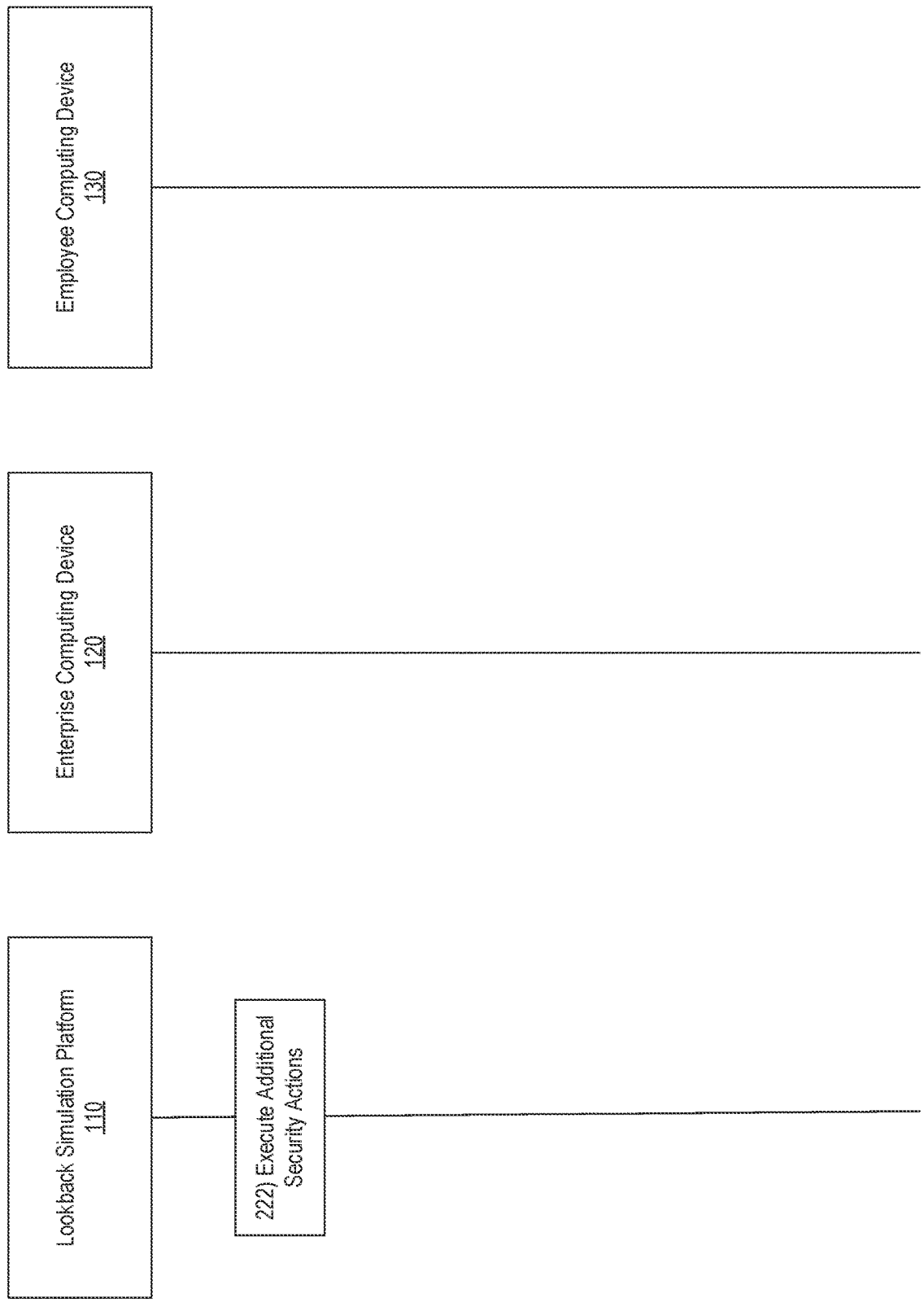

305

Compliance Notification

Pre-resignation activity for Person #1 appears to be in compliance with security protocols. No further action is needed.

Non-Compliance Notification

One or more non-compliance flags have been identified for Person #1. Further investigation is recommended.

FIG. 3B

PERFORMING RETROACTIVE THRESHOLD REDUCTION CONTROL REVIEW USING ARTIFICIAL INTELLIGENCE

BACKGROUND

Aspects of the disclosure relate to enterprise security. In some instances, an employee may enter their notice of resignation, or otherwise depart from an enterprise organization. In these instances, the enterprise organization may enhance security parameters or otherwise limit access for the employee during the time period between receipt of the resignation and the actual departure of the employee from the enterprise (e.g., final two weeks at the enterprise), so as to detect any anomalous behavior. This method may, however, be deficient in identifying anomalous behavior that occurred prior to entering of the notice of resignation. It may be important to improve security measures for analyzing a wider range of employee activities, while balancing limited computing resources and enterprise efficiency.

SUMMARY

Aspects of the disclosure provide effective, efficient, scalable, and convenient technical solutions that address and overcome the technical problems associated with security threshold adjustment and retroactive review. In accordance with one or more embodiments of the disclosure, a computing platform with at least one processor, a communication interface, and memory storing computer-readable instructions may monitor, for a plurality of employees, employee activity within an enterprise organization. The computing platform may generate, for each employee of the plurality of employees, employee control thresholds. The computing platform may generate, based on an indication from an employee computing device of an employee of the plurality of employees, modified employee control thresholds associated with the employee. The computing platform may generate data that may be used to train a machine learning model, which may include the employee activity associated with the employee, the employee control thresholds associated with the employee, and the modified employee control thresholds associated with the employee. The computing platform may generate, based on the indication, test data, which may include a subset of the employee activity associated with the employee. The computing platform may analyze, within a sandbox environment, the test data. The computing platform may determine, based on the analysis, whether to: 1) transmit a notification to an enterprise computing device indicating the test data complies with the employee control thresholds associated with the employee, or 2) transmit a notification to the enterprise computing device indicating the test data does not comply with the employee control thresholds associated with the employee.

In one or more instances, the enterprise device may be further configured to receive, from the computing platform, a notification indicating one of: test data compliance with the employee control thresholds associated with the employee, or test data non-compliance with the employee control thresholds associated with the employee. In one or more instances, the employee activity may indicate at least one of: enterprise databases accessed by the employee, enterprise applications accessed by the employee, a ledger indicating a date and a time that the employee entered the enterprise organization, human resources records associated with the employee, an IP address associated with the employee computing device, a multi-factor authentication process associated with the employee computing device, keyword searches performed by the employee, and/or other information.

In one or more instances, generating the employee control thresholds may include: 1) determining a role within the enterprise organization associated with the employee and a line of business associated with the employee; 2) determining an access level associated with the employee based on the role and the line of business; 3) comparing the access level associated with the employee to access levels associated with other employees, within the plurality of employees, in a same role and a same line of business as the employee; and 4) modifying the access level associated with the employee based on the comparison. In one or more instances, analyzing the test data may include: 1) comparing the test data to employee activity associated with other employees, within the plurality of employees, in the same role and the same line of business as the employee, 2) determining whether the test data matches the employee activity associated with the other employees, within the plurality of employees, in the same role and the same line of business as the employee, and 3) determining: a) based on the test data matching the employee activity associated with the other employees, that the test data is not an outlier, or b) based on the test data failing to match the employee activity associated with the other employees, that the test data is an outlier.

In one or more instances, the computing platform may implement, based on the indication from the employee computing device, the modified employee control thresholds. The computing platform may initiate, based on the notification indicating the test data does not comply with the employee control thresholds associated with the employee, a security review of the employee activity associated with the employee.

In one or more instances, the indication from the employee computing device may include at least one of: a letter of resignation, suspicious activity flagged within the employee activity associated with the employee, or reduced employee presence within the enterprise organization.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for performing retroactive threshold reduction control review using artificial intelligence in accordance with one or more example embodiments;

FIGS. 3A-3B depict illustrative graphical user interfaces depicting retroactive threshold reduction control review using artificial intelligence in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for retroactively adjusting control review thresholds and performing lookback analysis accordingly. On any voluntary or non-voluntary separation from a company, there might not be a way to retroactively determine if a tighter control threshold would have been triggered, if applied. Controls may be adjusted based on the tender of a resignation or pending termination. One method to circumvent controls is exfiltrating data below the standard threshold over an extended period of time. For example, a customer may take out $9,500 over multiple withdrawals to avoid a $10,000 reporting notification limit. It may be very resource intensive and limit business functionality to have very strict thresholds on all employees.

Accordingly, described here is an artificial intelligence threshold reduction control review method, which may reduce thresholds across numerous controls (e.g., email, upload, print, and/or other activities) and may replicate the activity over an adjustable period of time to detect patterns of network behavior prior to the departure notification.

As an illustrative example, currently, Employee X may tender their resignation and control thresholds may be adjusted based on the date of notification. In the proposed solution, Employee X may tender their resignation and not only may controls be adjusted going forward, but all activity over the previous six months (or other adjustable timeframe) may be replicated, and this activity may be run through the tightened thresholds to determine insider threat activity. Conducting this review on employees departing a company may reduce the resource requirement, allow for business to function, and/or mitigate risk by detecting insider threat activity prior to separation.

Figure 1A:
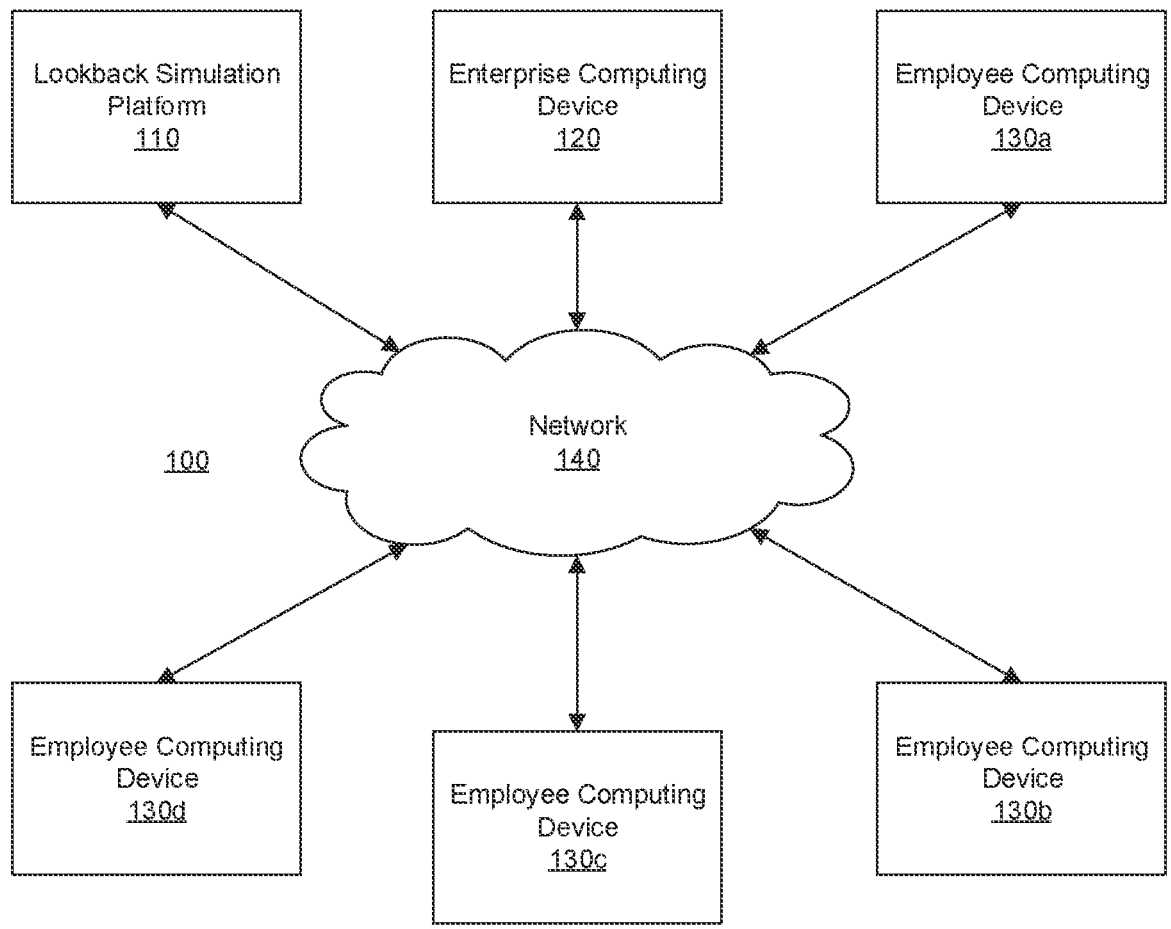
FIGS. 1A-1B depict an illustrative computing environment for performing retroactive threshold reduction control review using artificial intelligence in accordance with one or more example embodiments.
Figure 1B:
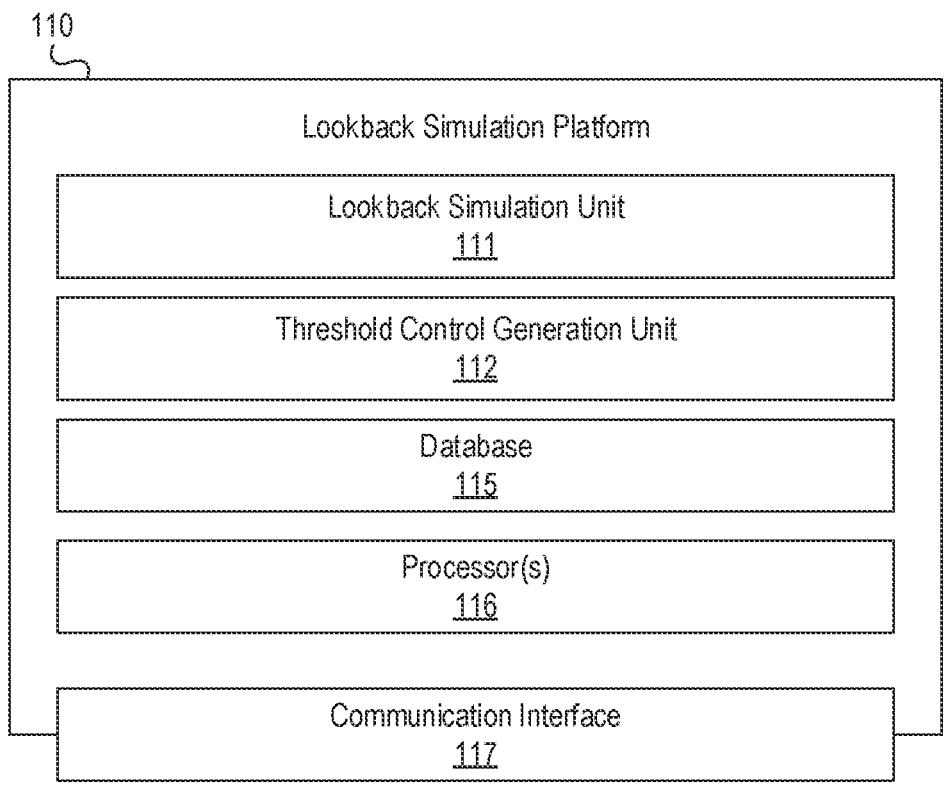

FIGS. 1A-1B depict an illustrative computing environment for performing retroactive threshold reduction control review using artificial intelligence in accordance with one or more example embodiments. Referring to FIG. 1A, computing environment 100 may include one or more computer systems. For example, computing environment 100 may include a lookback simulation platform 110, enterprise computing device 120, and one or more employee computing devices (e.g., 130a-130d).

As described further below, lookback simulation platform 110 may be a computer system that includes one or more computing devices (e.g., servers, server blades, or the like) and/or other computer components (e.g., processors, memories, communication interfaces) that may be used to configure and train one or more artificial intelligence/machine learning models. For example, the lookback simulation platform 110 may train the one or more artificial intelligence models to identify retroactive and user specific thresholds, and to identify data anomalies based on these thresholds accordingly. In some instances, lookback simulation platform 110 may be controlled or otherwise maintained by an enterprise organization such as a financial institution.

Enterprise computing device 120 may be a data storing device (e.g., laptop computer, desktop computer, mobile device, tablet, smartphone, server, server blade, and/or other device) and/or other data storing component (e.g., processors, memories, communication interfaces, databases) that may be used to collect employee activity data/information and to store this data accordingly. In one or more instances, enterprise computing device 120 may correspond to a first user (who may, e.g., be security administrator of the enterprise organization such as a financial institution). In one or more instances, the enterprise computing device 120 may be configured to display one or more graphical user interfaces (e.g., compliance notifications, non-compliance notifications, and/or other interfaces). Although a single enterprise computing device 120 is depicted, this is for illustrative purposes only, and any number of enterprise computing devices may be implemented without departing from the scope of the disclosure.

Employee computing devices 130a-130d may be a computing device (e.g., laptop computer, desktop computer, mobile device, tablet, smartphone, or other computing device) and/or other computer components (e.g., processors, memories, communication interfaces) that may be used to perform various enterprise actions (e.g., send email, upload/download information, print, grant/deny RFID access to a physical premises, and/or other perform actions). Additionally, in some instances, the employee computing devices 130a-130d may be used to submit a resignation and/or termination notification (e.g., to the enterprise computing device 120). In some instances, the employee computing devices 130a-130d may be configured to display one or more graphical user interfaces.

Computing environment 100 also may include one or more networks, which may interconnect lookback simulation platform 110, enterprise computing device 120, and employee computing devices 130a-d. For example, computing environment 100 may include a network 140 (which may interconnect, e.g., lookback simulation platform 110, enterprise computing device 120, and employee computing devices 130a-d).

In one or more arrangements, lookback simulation platform 110, enterprise computing device 120, and employee computing devices 130a-d may be any type of computing device capable of sending and/or receiving requests and processing the requests accordingly. For example, lookback simulation platform 110, enterprise computing device 120, employee computing devices 130a-d, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of lookback simulation platform 110, enterprise computing device 120, and/or employee computing devices 130a-d, may, in some instances, be special-purpose computing devices configured to perform specific functions.

Referring to FIG. 1B, lookback simulation platform 110 may include one or more processors (e.g., processor(s) 116), memory, and a communication interface (e.g., communication interface 117)). A data bus may interconnect the processor, memory, and communication interface. Communication interface 117 may be a network interface configured to support communication between lookback simulation platform 110 and one or more networks (e.g., network 140, or the like). Communication interface 117 may be communicatively coupled to the processor(s) 116. The memory may include one or more program modules having instructions that when executed by processor(s) 116 cause lookback simulation platform 110 to perform one or more functions described herein and/or one or more databases that may store and/or otherwise maintain information which may be used by such program modules and/or processor(s) 116. In some instances, the one or more program modules and/or databases may be stored by and/or maintained in different memory units of lookback simulation platform 110 and/or by different computing devices that may form and/or otherwise make up lookback simulation platform 110. For example, the memory may have, host, store, and/or include lookback simulation unit 111, threshold control generation unit 112, and/or database 115.

Lookback simulation unit 111 may have instructions that direct and/or cause lookback simulation platform 110 to retroactively compare employee action information to reduced thresholds for anomaly detection. Threshold control generation unit 112 may implement, refine, train, maintain, and/or otherwise refine an artificial intelligence model that may be used to perform retroactive threshold adjustment. Database 115 may have instructions and/or data used by lookback simulation unit 111, threshold control generation unit 112, and/or lookback simulation platform 110 to perform retroactive threshold adjustment and analysis.

Figure 2A:
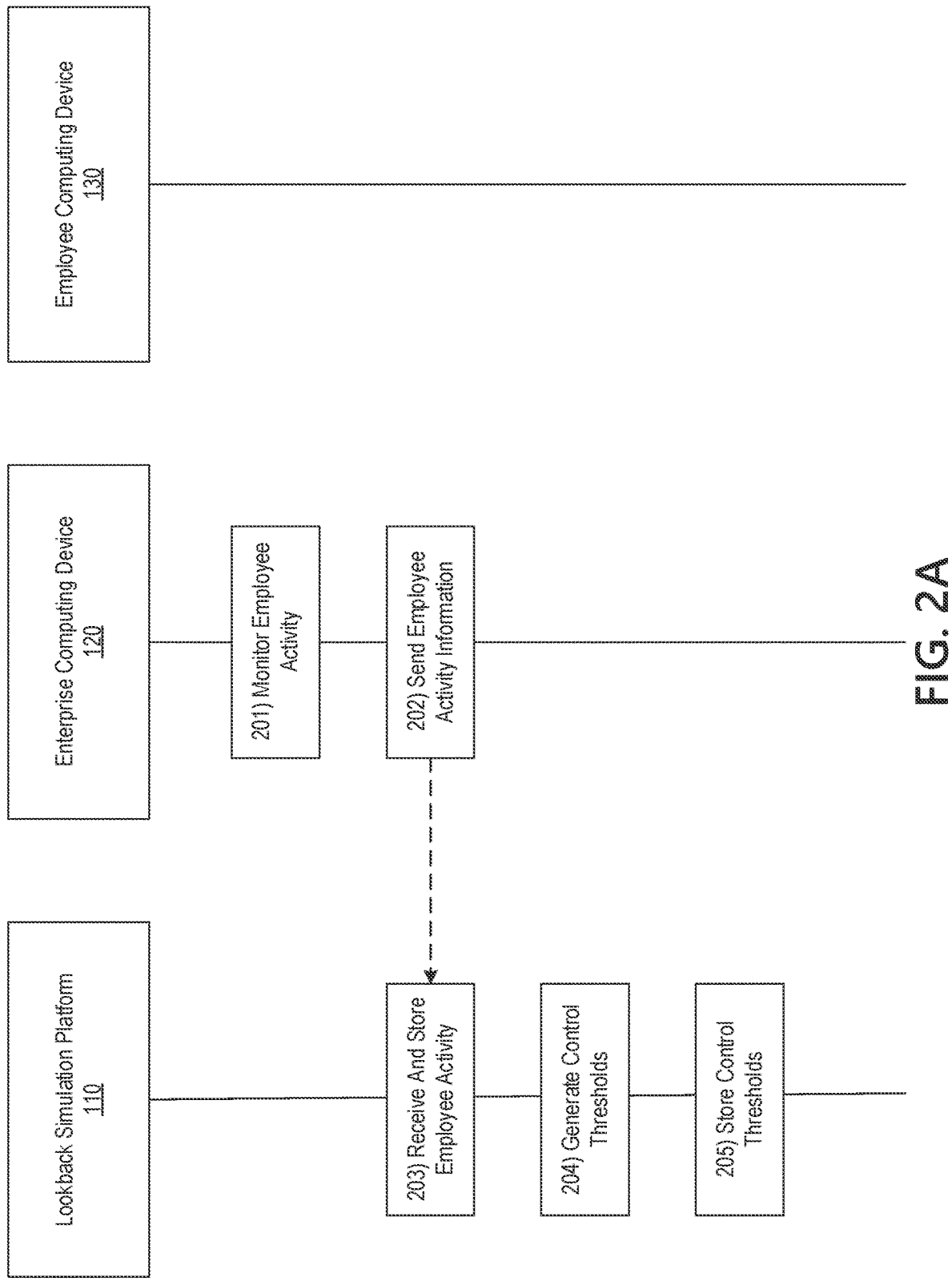

FIGS. 2A-2E depict an illustrative event sequence for performing retroactive threshold reduction control review using artificial intelligence in accordance with one or more example embodiments. Referring to FIG. 2A, at step 201, enterprise computing device 120 may monitor employee activity at one or more employee computing devices (e.g., employee computing devices 140a-d). For example, the enterprise computing device 120 may monitor and/or otherwise collect information such as messages sent, files downloaded/uploaded, office location, residential location, client location, vacation requests, internet protocols associated with various employee computing devices, printer logs, proxy logs, virtual private network logs, door badge access logs (e.g., a ledger indicating a date and/or time that the employee entered the enterprise organization), human resource records, databases accessed (and/or length of access), applications accessed (and/or length access), devices used, multifactor authentication information/processes associated with the various employee computing devices, single sign on logs accessed, websites accessed, key word searches performed, and/or other information. In some instances, in collecting this employee activity information, the enterprise computing device 120 may collect information of a historical ninety day (or other predetermined) time window (and may thus update a data store on a daily or other predetermined basis to maintain data corresponding to the predetermined historical time window).

At step 202, after collecting the employee activity information, the enterprise computing device 120 may send the employee activity information to the lookback simulation platform 110. For example, the enterprise computing device 120 may send the employee activity information to the lookback simulation platform 110 at a predetermined interval (e.g., daily, or the like). In some instances, the enterprise computing device 120 may send the employee activity information to the lookback simulation platform 110 while a wired or wireless connection is established with the lookback simulation platform 110.

At step 203, the lookback simulation platform 110 may receive and store the employee activity information sent at step 202. For example, the lookback simulation platform 110 may receive the employee activity information via the communication interface 117 and while a wired or wireless data connection is established with the enterprise computing device 120.

At step 204, the lookback simulation platform 110 may generate standard threshold controls based on the employee activity information. For example, the lookback simulation platform 110 may set one or more control limits, based on the employee activity information, which may be used to flag anomalous behavior. In some instances, the lookback simulation platform 110 may set or otherwise generate the standard threshold controls on an employee specific basis (e.g., based on job title, level of seniority, access level, and/or other information).

For example, the lookback simulation platform 110 may compare this employee specific information to other employee information, so as to determine similar standard threshold controls for other similarly situated employees in the same role, line of business, with similar access privileges, or the like. In some instances, the lookback simulation platform 110 may set different standard threshold controls for employees during the normal course of their time with the enterprise and during a period of time prior to termination, resignation, or otherwise ending work at the enterprise. For example, the lookback simulation platform 110 may set more stringent standard threshold controls (e.g., lower thresholds) during an employee's final two weeks with the enterprise (which may, e.g., further be based on a level of access, a reason why the employee is leaving the enterprise, and/or otherwise). In some instances, the lookback simulation platform 110 may dynamically update these standard threshold controls as new employee activity information is received. For example, the lookback simulation platform 110 may modify access levels/standard threshold controls based on updated comparisons of employee information for a given employee to other similarly situated employees (e.g., same role, line of business, access level, and/or otherwise) and their corresponding standard threshold controls.

By way of example, certain standard threshold controls may be selected for an employee such as a 10 MB data in motion limit, a 5 MB upload/download limit, a 25 page print limit, and/or other similar limits.

At step 205, the lookback simulation platform 110 may store the standard threshold controls. For example, the lookback simulation platform 110 may store the standard threshold controls in a threshold database (e.g., of the database 115).

Figure 2B:
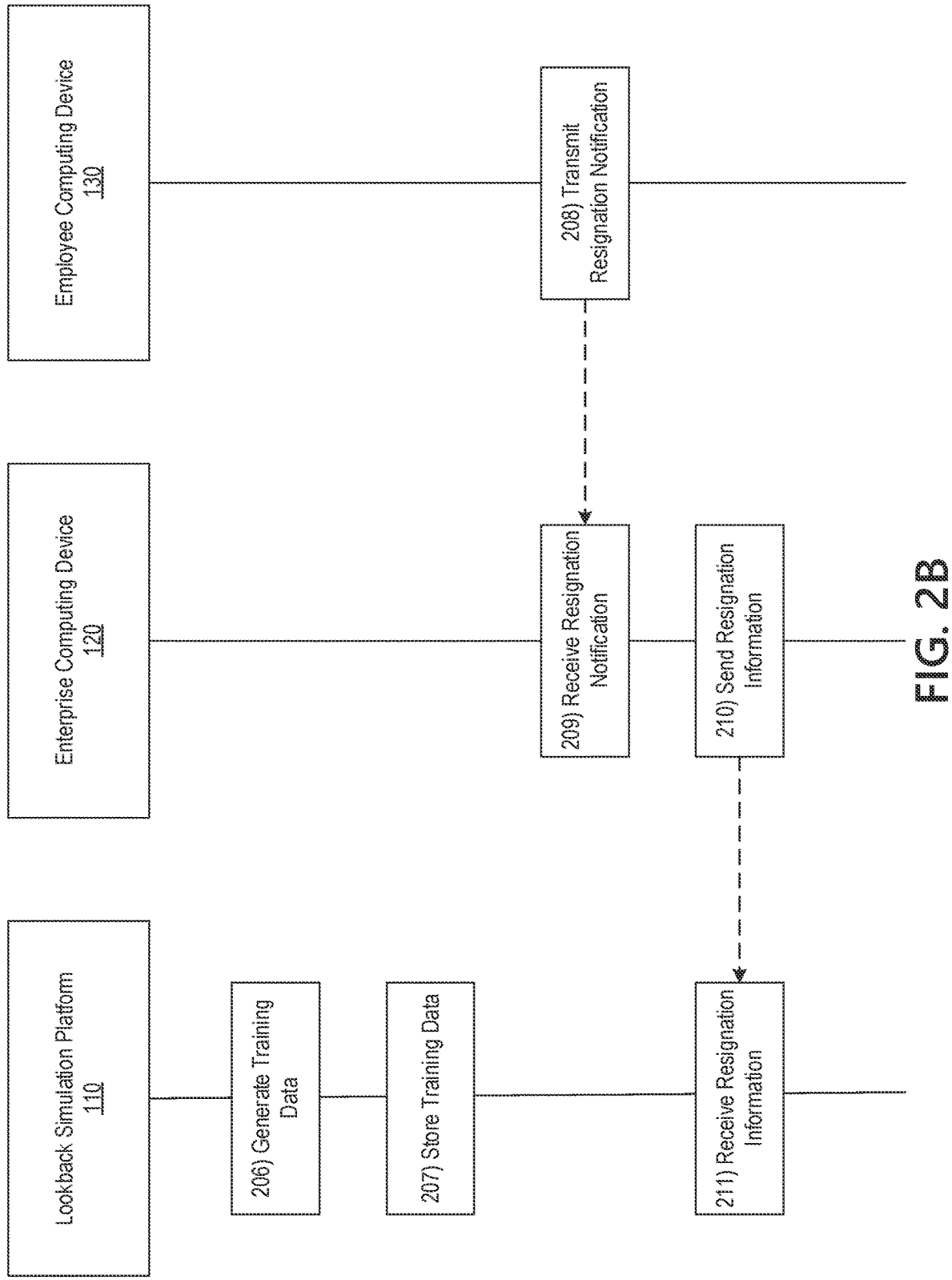

Referring to FIG. 2B, at step 206, the lookback simulation platform 110 may generate training data for an artificial intelligence model that may be used to retroactively reduce (or otherwise modify) the standard threshold controls. For example, the lookback simulation platform 110 may select a portion of the employee activity information to use as training data, and/or may use all of the employee activity information included in the predetermined time window (e.g., ninety days). In some instances, the lookback simulation platform 110 may also label the training data (e.g., based on employee role, access level, line of business, and/or other employee identifier information).

At step 207, the lookback simulation platform 110 may store the training data and use the training data to train the artificial intelligence model. For example, the lookback simulation platform 110 may use the training data to identify average and/or median activity for employees of the various roles, access levels, lines of business, and/or other user groups, and to set exit threshold controls accordingly. For example, the exit threshold controls may be reduced (or otherwise modified) when compared to the standard threshold controls, so as to tighten controls/reduce leniency for employee actions once a departure of a given employee from the enterprise is identified (e.g., planned termination, notice of resignation, and/or otherwise). In doing so, the lookback simulation platform 110 may further train the artificial intelligence model to determine if received employee activity information is anomalous when compared to other employee activity information once a departure is identified, and flag the corresponding employee accordingly. For example, the artificial intelligence model may be trained to identify customized exit threshold controls for an employee once the employee submits their notice of resignation, and may compare activity for the employee, during their final two weeks at the enterprise, to the exit threshold controls rather than the standard threshold controls, to identify any anomalous behavior (e.g., so as to apply more stringent security measures immediately prior to departure than during the employee's remaining tenure at the enterprise).

In some instances, in training the artificial intelligence model, the lookback simulation platform 110 may train a supervised learning model. For example, the lookback simulation platform 110 may train an artificial neural network, a boosting algorithm, a decision tree model, a nearest neighbor algorithm, a support vector machine, a random forest model, and/or other supervised learning models. Additionally or alternatively, in training the artificial intelligence model, the lookback simulation platform 110 may train an unsupervised learning model. For example, the lookback simulation platform 110 may train a clustering model, anomaly detection model, and/or other unsupervised learning model.

At step 208, the employee computing device 130 may transmit a resignation notification for an employee to the enterprise computing device 120 (e.g., indicating a "two week notice," or other intent to resign from the enterprise). For example, the employee computing device 130 may transmit the resignation notification while a wired or wireless connection is established between the enterprise computing device 120 and the employee computing device 130.

At step 209, the enterprise computing device 120 may receive the resignation notification sent at step 208. For example, the enterprise computing device 120 may receive the resignation notification while a wired or wireless connection is established between the enterprise computing device 120 and the employee computing device 130.

At step 210, the enterprise computing device 120 may send resignation information, based on the resignation notification, to the lookback simulation platform 110. For example, the enterprise computing device 120 may send a reason for resignation, employee access levels, the employee's role within the enterprise, standard control thresholds, exit control thresholds, and/or other information corresponding to the resignation/employee. For example, the enterprise computing device 120 may send the resignation information while a wired or wireless connection is established between the lookback simulation platform 110 and the enterprise computing device 120.

At step 211, the lookback simulation platform 110 may receive the resignation information sent at step 210. For example, the lookback simulation platform 110 may receive the resignation information while a wired or wireless connection is established between the lookback simulation platform 110 and the enterprise computing device 120. Although steps 208-210 describe transmission/receipt of notifications/information of a resignation, information of any type of departure from the enterprise may be sent/received without departing from the scope of the disclosure (e.g., a termination, suspension, and/or other departure). For example, rather than a letter or other notification of a resignation, suspicious activity may be flagged, reduced employee presence may be detected, and/or other information indicative of an imminent departure.

Figure 2C:
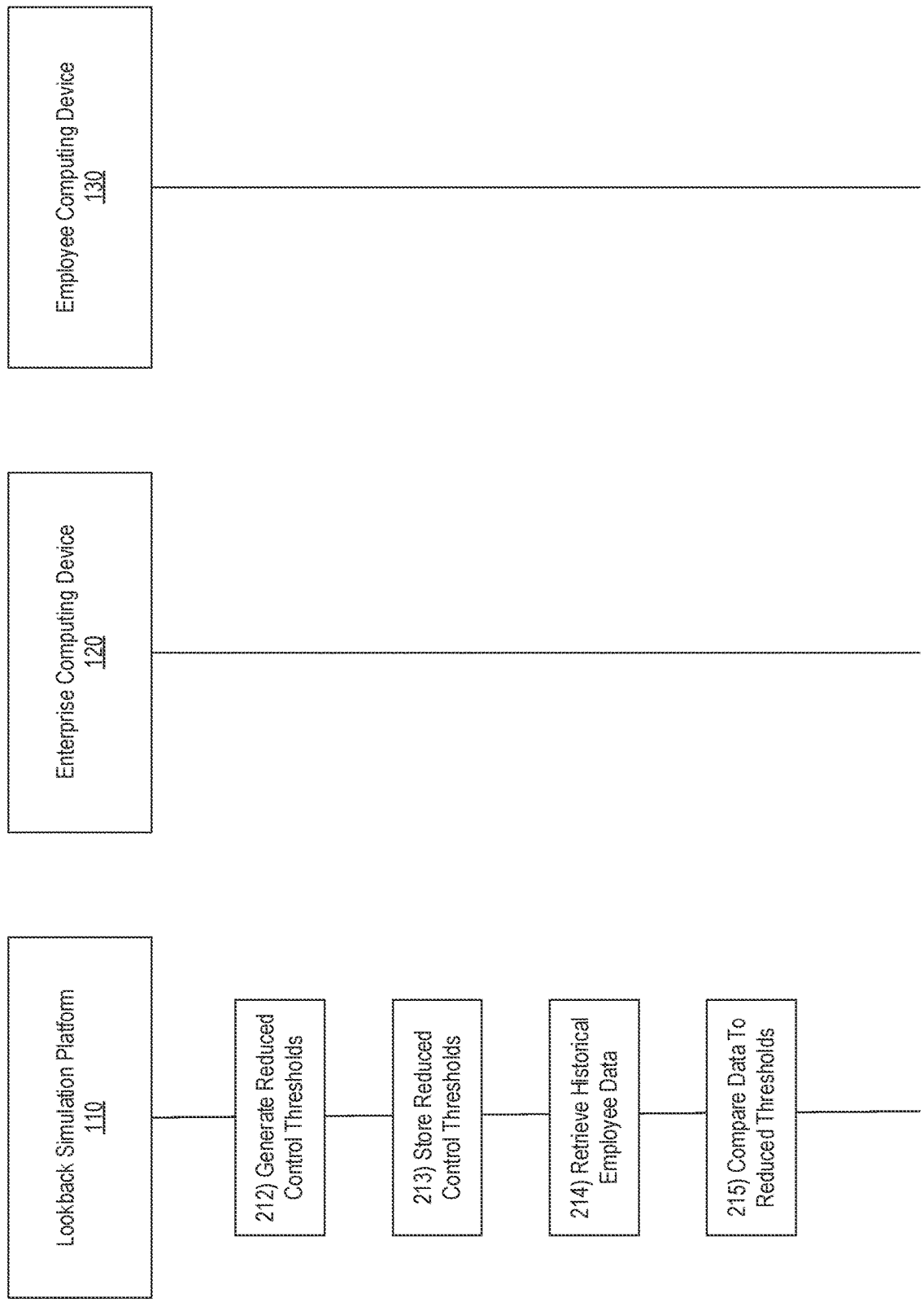

Referring to FIG. 2C, at step 212, the lookback simulation platform 110 may input the employee resignation information into the artificial intelligence model to output exit threshold controls for the employee. For example, the lookback simulation platform 110 may compare the employee resignation information to stored employee information, and may select exit threshold controls corresponding to similar employees. After outputting the exit threshold controls, the lookback simulation platform 110 may feed these exit threshold controls and the corresponding resignation information into the artificial intelligence model to dynamically and continuously refine the model. In doing so, the lookback simulation platform 110 may establish a continuous feedback loop that may, e.g., improve the accuracy of the artificial intelligence model in predicting effective exit threshold controls (and/or standard threshold controls) going forward.

In some instances, the lookback simulation platform 110 may output exit threshold controls that match the standard control thresholds. For example, the lookback simulation platform 110 may identify that the standard control thresholds for a particular employee already provide a sufficient level of security. Alternatively, the lookback simulation platform 110 may identify that the standard control thresholds should be reduced to create the exit threshold controls (e.g., because the employee had an elevated level of access).

As particular examples, the lookback simulation platform 110 may reduce standard threshold controls to create exit threshold controls such as: reducing the 10 MB data in motion limit to 1 MB, the 5 MB upload/download limit to 1 MB, a 25 page print limit to 1 page, and/or other similar limits. As another example, the lookback simulation platform 110 may identify 7AM-8PM as normal work hours (e.g., standard threshold controls) for the employee based on their employee information (e.g., job role, access levels, line of business, or the like), but may reduce this to 7AM-5PM as the exit control thresholds.

At step 213, the lookback simulation platform 110 may store the exit threshold controls generated at step 212. For example, the lookback simulation platform 110 may store the exit threshold controls for use in anomaly detection for a period of time between receipt of the resignation notification and an actual departure from the enterprise (e.g., the employee's final two weeks at the enterprise, or the like).

At step 214, the lookback simulation platform 110 may retrieve historical employee activity information. For example, the lookback simulation platform 110 may retrieve the employee activity information for the employee such as the employee activity information stored at step 203 (e.g., the last ninety days, or other predetermined period). Once retrieved, the lookback simulation platform 110 may duplicate the historical employee activity information for sandbox simulation as described below.

At step 215, the lookback simulation platform 110 may execute a simulation in a sandbox or other controlled environment using the duplicated employee activity information. For example, the lookback simulation platform 110 may compare the duplicated employee activity information against the exit threshold controls output at step 212. For example, the lookback simulation platform 110 may compare the duplicated employee activity information to employee activity information of other employees in the same enterprise role, with the same access levels, in the same line of business, and/or similar employee characteristics. For example, if the duplicated employee activity information matches the employee activity information of other employees, and thus complies with the exit threshold controls, the lookback simulation platform 110 may determine that the duplicated employee activity information does not include outliers. Otherwise, if the duplicated employee activity information does not match the employee activity information of the other employees, and thus does not comply with the exit threshold controls, the lookback simulation platform 110 may determine that the duplicated employee activity information includes at least one outlier. In doing so, the lookback simulation platform 110 may detect any anomalous behavior from the employee, not only during the period of time immediately prior to departure from the enterprise (e.g., the last two weeks), but also in the lead up to this period (e.g., last ninety days at the enterprise, or the like).

In some instances, in addition or as an alternative to comparing the duplicated employee information to specific thresholds, the lookback simulation platform 110 may compare the duplicated employee information to other anticipated values/information. For example, the lookback simulation platform 110 may identify whether or not the employee is connecting from a different IP address, different device, and/or otherwise engaging in an unanticipated connection. In some instances, the lookback simulation platform 110 may identify whether human resource records indicate approved travel and/or other explanations for the varied connectivity settings. If a valid explanation is not identified, an anomaly may be detected. Otherwise, if a valid explanation is identified, an anomaly might not be detected.

In some instances, lookback simulation platform 110 may identify that at least some portion of the duplicated employee activity information fails (or is otherwise non-compliant with) the exit threshold controls (e.g., and thus includes an anomaly). In these instances, the lookback simulation platform 110 may proceed to step 217. In other instances, the lookback simulation platform 110 may identify that the duplicated employee activity information satisfies (or is otherwise compliant with) the exit threshold controls. In these instances, the lookback simulation platform 110 may proceed to step 216.

In some instances, the secure sandbox may be located at the lookback simulation platform 110. In other instances, the secure sandbox may be located at a different computing system.

Figure 2D:
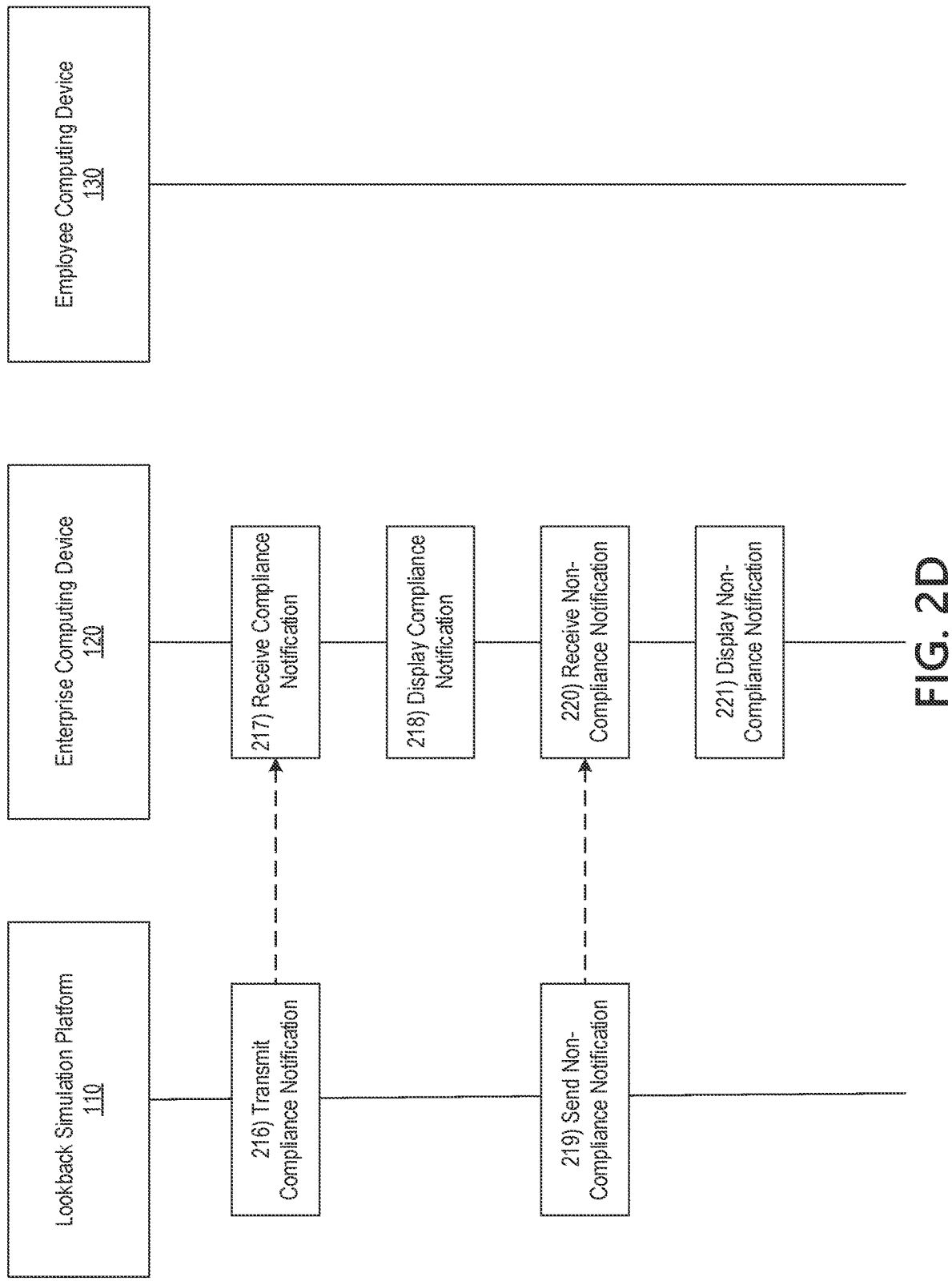

Referring to FIG. 2D, at step 216, based on or in response to identifying that the duplicated employee activity information for the employee is compliant with the exit threshold controls, the lookback simulation platform 110 may generate and send a compliance notification to the enterprise computing device 120. For example, the lookback simulation platform 110 may send the compliance notification to the enterprise computing device 120 via the communication interface 117 and while a wired or wireless data connection is established between the lookback simulation platform 110 and the enterprise computing device 120. In some instances, the lookback simulation platform 110 may also send one or more commands directing the enterprise computing device 120 to display the compliance notification.

At step 217, the enterprise computing device 120 may receive the compliance notification sent at step 216. In some instances, the enterprise computing device 120 may receive the compliance notification while a wired or wireless connection is established between the lookback simulation platform 110 and the enterprise computing device 120. In some instances, the enterprise computing device 120 may also receive the one or more commands directing the enterprise computing device 120 to display the compliance notification.

At step 218, based on or in response to the one or more commands directing the enterprise computing device 120 to display the compliance notification, the enterprise computing device 120 may display the compliance notification. For example, the enterprise computing device 120 may display a graphical user interface similar to graphical user interface 305 (e.g., indicating that the employee is in compliance with security protocols). In these instances, the event sequence might not proceed to step 219.

At step 219, based on or in response to identifying that the duplicated employee activity information for the employee is not compliant with the exit threshold controls, the lookback simulation platform 110 may generate and send a non-compliance notification to the enterprise computing device 120. For example, the lookback simulation platform 110 may send the non-compliance notification to the enterprise computing device 120 via the communication interface 117 and while a wired or wireless data connection is established between the lookback simulation platform 110 and the enterprise computing device 120. In some instances, the lookback simulation platform 110 may also send one or more commands directing the enterprise computing device 120 to display the non-compliance notification.

At step 220, the enterprise computing device 120 may receive the non-compliance notification sent at step 219. In some instances, the enterprise computing device 120 may receive the non-compliance notification while a wired or wireless connection is established between the lookback simulation platform 110 and the enterprise computing device 120. In some instances, the enterprise computing device 120 may also receive the one or more commands directing the enterprise computing device 120 to display the non-compliance notification.

At step 221, based on or in response to the one or more commands directing the enterprise computing device 120 to display the non-compliance notification, the enterprise computing device 120 may display the non-compliance notification. For example, the enterprise computing device 120 may display a graphical user interface similar to graphical user interface 310 (e.g., indicating that the employee is not in compliance with security protocols).

Referring to FIG. 2E, at step 222, based on or in response to identifying that the duplicated employee activity information for the employee is not compliant with the exit threshold controls, the lookback simulation platform 110 may execute one or more additional security actions (or otherwise cause/direct one or more other computing devices to execute security actions). For example, the lookback simulation platform 110 may automatically retract electronic access privileges, revoke physical premises access (e.g., direct an enterprise security system to modify or otherwise revoke RFID badge access permissions, which may, e.g., cause the enterprise security system to deny of access at one or more enterprise RFID scanners, or otherwise), modify other security privileges of the employee (e.g.,, by communicating with an enterprise security system), and/or otherwise initiate a security review of the employee.

Although primarily the lookback/retroactive analysis is described herein, analysis of employee activity may also continuously be performed (e.g., using the standard threshold controls to detect current data) and/or performed once a notice of resignation or other indication of departure is detected (e.g., using the exit threshold controls to analyze current data) without departing from the scope of the disclosure.

Figure 4:
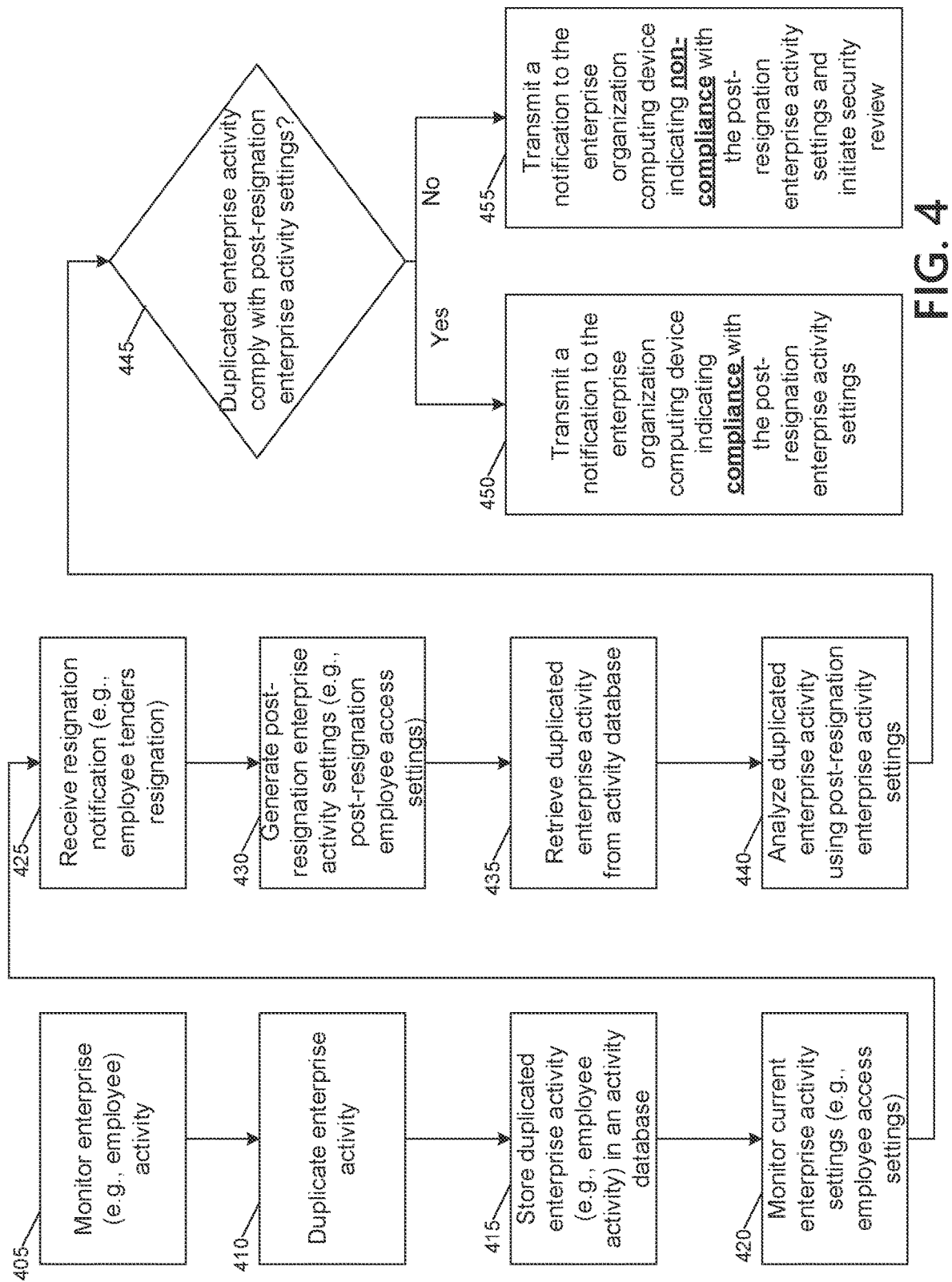
FIG. 4 depict an illustrative method for performing retroactive threshold reduction control review using artificial intelligence in accordance with one or more example embodiments.

FIG. 4 depicts an illustrative method for performing retroactive threshold reduction control review using artificial intelligence in accordance with one or more example embodiments. Referring to FIG. 4, at step 405, a computing platform having at least one processor, a communication interface, and memory may monitor an enterprise to detect employee activity. At step 410, the computing platform may duplicate the enterprise activity. At step 415, the computing platform may store the duplicated employee activity. At step 420, the computing platform may monitor current enterprise activity settings (e.g., employee access settings, and/or other settings). At step 425, the computing platform may receive a resignation notification. At step 430, the computing platform may generate post-resignation enterprise activity settings (e.g., post-resignation employee access settings). At step 435, the computing platform may retrieve duplicated enterprise activity. At step 440, the computing platform may analyze the duplicated enterprise activity using the post-resignation enterprise activity settings. At step 445, the computing platform may identify whether the duplicated enterprise activity complies with post-resignation enterprise activity settings. If the duplicated enterprise activity does comply with the post-resignation enterprise activity settings, the computing platform may proceed to step 450. If the duplicated enterprise activity does not comply with the post-resignation enterprise activity settings, the computing platform may proceed to step 455.

At step 450, the computing platform may transmit a notification to an enterprise organization computing device indicating compliance with the post-resignation enterprise activity settings. At step 455, the computing platform may transmit a notification to the enterprise organization computing device indicating non-compliance with the post-resignation enterprise activity settings, and/or may initiate security review of the corresponding employee and/or execute additional security actions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed:

1. A computing platform comprising:
   at least one processor;
   a communication interface communicatively coupled to the at least one processor; and
   memory storing computer-readable instructions that, when executed by the processor, cause the computing platform to:
   monitor, for a plurality of employees, employee activity within an enterprise organization;
   generate, for each employee of the plurality of employees, employee control thresholds;
   generate, based on an indication from an employee computing device of an employee of the plurality of employees, modified employee control thresholds associated with the employee; and
   generate data that is used to train a machine learning model, wherein the training data comprises the employee activity associated with the employee, the employee control thresholds associated with the employee, and the modified employee control thresholds associated with the employee;

train, based on the data and using one or more supervised learning techniques, the machine learning model, wherein training the machine learning model configures the machine learning model to perform anomaly detection in analysis of employee activity information;

generate, based on the indication, test data, wherein the test data comprises a subset of the employee activity associated with the employee;

analyze, within a sandbox environment, the test data;

determine, based on the analysis, whether to:
transmit a notification to an enterprise computing device indicating the test data complies with the employee control thresholds associated with the employee; or
transmit a notification to the enterprise computing device indicating the test data does not comply with the employee control thresholds associated with the employee; and
refine, using a dynamic feedback loop and based on the modified employee control thresholds, the machine learning model, wherein the refining continuously improves accuracy of the machine learning model.

2. The computing platform of claim 1, wherein:
the enterprise computing device is further configured to receive, from the computing platform, a notification indicating one of:
test data compliance with the employee control thresholds associated with the employee; or
test data non-compliance with the employee control thresholds associated with the employee.

3. The computing platform of claim 1, wherein the employee activity indicates at least one of:
enterprise databases accessed by the employee;
enterprise applications accessed by the employee;
a ledger indicating a date and a time that the employee entered the enterprise organization;
human resources records associated with the employee;
an IP address associated with the employee computing device;
a multi-factor authentication process associated with the employee computing device; or
keyword searches performed by the employee.

4. The computing platform of claim 1, wherein the generating the employee control thresholds comprises:
determining a role within the enterprise organization associated with the employee and a line of business associated with the employee;
determining an access level associated with the employee based on the role and the line of business;
comparing the access level associated with the employee to access levels associated with other employees, within the plurality of employees, in a same role and a same line of business as the employee; and
modifying the access level associated with the employee based on the comparison.

5. The computing platform of claim 4, wherein the analyzing the test data comprises:
comparing the test data to employee activity associated with other employees, within the plurality of employees, in the same role and the same line of business as the employee;
determining whether the test data matches the employee activity associated with the other employees, within the plurality of employees, in the same role and the same line of business as the employee; and determining:
based on the test data matching the employee activity associated with the other employees, that the test data is not an outlier; or
based on the test data failing to match the employee activity associated with the other employees, that the test data is an outlier.

6. The computing platform of claim 1, wherein the memory stores additional computer-readable instructions that, when executed by the processor, further cause the computing platform to:
implement, based on the indication from the employee computing device, the modified employee control thresholds; and
initiate, based on the notification indicating the test data does not comply with the employee control thresholds associated with the employee, a security review of the employee activity associated with the employee.

7. The computing platform of claim 1, wherein the indication from the employee computing device comprises at least one of:
a letter of resignation;
suspicious activity flagged within the employee activity associated with the employee; or
reduced employee presence within the enterprise organization.

8. A method comprising:
at a computing device comprising at least one processor, a communication interface, and memory:
monitoring, for a plurality of employees, employee activity within an enterprise organization;
generating, for each employee of the plurality of employees, employee control thresholds;
generating, based on an indication from an employee computing device of an employee of the plurality of employees, modified employee control thresholds associated with the employee;
generating training data for training a machine learning model, wherein the training data comprises the employee activity associated with the employee, the employee control thresholds associated with the employee, and the modified employee control thresholds associated with the employee;
training, based on the data and using one or more supervised learning techniques, the machine learning model, wherein training the machine learning model configures the machine learning model to perform anomaly detection in analysis of employee activity information;
generating, based on the indication, test data, wherein the test data comprises a subset of the employee activity associated with the employee;
analyzing, within a sandbox environment, the test data;
determining, based on the analysis, whether to:
transmit a notification to the enterprise organization indicating the test data complies with the employee control thresholds associated with the employee; or
transmit a notification to the enterprise organization indicating the test data does not comply with the employee control thresholds associated with the employee; and
refining, using a dynamic feedback loop and based on the modified employee control thresholds, the machine learning model, wherein the refining continuously improves accuracy of the machine learning model.

9. The method of claim 8, wherein:
the enterprise computing device is further configured to receive, from the computing device, a notification indicating one of:
test data compliance with the employee control thresholds associated with the employee; or
test data non-compliance with the employee control thresholds associated with the employee.

10. The method of claim 8, wherein the employee activity indicates at least one of:
enterprise databases accessed by the employee;
enterprise applications accessed by the employee;
a ledger indicating a date and a time that the employee entered the enterprise organization;
human resources records associated with the employee;
an IP address associated with the employee computing device;
a multi-factor authentication process associated with the employee computing device; or
keyword searches performed by the employee.

11. The method of claim 8, wherein the generating the employee control thresholds comprises:
determining a role within the enterprise organization associated with the employee and a line of business associated with the employee;
determining an access level associated with the employee based on the role and the line of business;
comparing the access level associated with the employee to access levels associated with other employees, within the plurality of employees, in a same role and a same line of business as the employee; and
modifying the access level associated with the employee based on the comparison.

12. The method of claim 11, wherein the analyzing the test data comprises:
comparing the test data to employee activity associated with other employees, within the plurality of employees, in the same role and the same line of business as the employee;
determining whether the test data matches the employee activity associated with the other employees, within the plurality of employees, in the same role and the same line of business as the employee; and
determining:
based on the test data matching the employee activity associated with the other employees, that the test data is not an outlier; or
based on the test data failing to match the employee activity associated with the other employees, that the test data is an outlier.

13. The method of claim 8, further comprising:
implementing, based on the indication from the employee computing device, the modified employee control thresholds; and
initiating, based on the notification indicating the test data does not comply with the employee control thresholds associated with the employee, a security review of the employee activity associated with the employee.

14. The method of claim 8, wherein the indication from the employee computing device comprises at least one of:
a letter of resignation;
suspicious activity flagged within the employee activity associated with the employee; or
reduced employee presence within the enterprise organization.

15. One or more non-transitory computer-readable media storing instructions that, when executed by a computing device comprising at least one processor, a communication interface, and memory, cause the computing device to:
monitor, for a plurality of employees, employee activity within an enterprise organization;
generate, for each employee of the plurality of employees, employee control thresholds;
generate, based on an indication from an employee computing device of an employee of the plurality of employees, modified employee control thresholds associated with the employee; and
generate data that is used to train a machine learning model, wherein the training data comprises the employee activity associated with the employee, the employee control thresholds associated with the employee, and the modified employee control thresholds associated with the employee;
train, based on the data and using one or more supervised learning techniques, the machine learning model, wherein training the machine learning model configures the machine learning model to perform anomaly detection in analysis of employee activity information;
generate, based on the indication, test data, wherein the test data comprises a subset of the employee activity associated with the employee;
analyze, within a sandbox environment, the test data; and
determine, based on the analysis, whether to:
transmit a notification to an enterprise computing device indicating the test data complies with the employee control thresholds associated with the employee; or
transmit a notification to the enterprise computing device indicating the test data does not comply with the employee control thresholds associated with the employee; and
refine, using a dynamic feedback loop and based on the modified employee control thresholds, the machine learning model, wherein the refining continuously improves accuracy of the machine learning model.

16. The one or more non-transitory computer-readable media of claim 15, wherein:
the enterprise computing device is further configured to receive, from the computing device, a notification indicating one of:
test data compliance with the employee control thresholds associated with the employee; or
test data non-compliance with the employee control thresholds associated with the employee.

17. The one or more non-transitory computer-readable media of claim 15, wherein the employee activity indicates at least one of:
enterprise databases accessed by the employee;
enterprise applications accessed by the employee;
a ledger indicating a date and a time that the employee entered the enterprise organization;
human resources records associated with the employee;
an IP address associated with the employee computing device;
a multi-factor authentication process associated with the employee computing device; or
keyword searches performed by the employee.

18. The one or more non-transitory computer-readable media of claim 15, wherein the generating the employee control thresholds comprises:
determining a role within the enterprise organization associated with the employee and a line of business associated with the employee;

determining an access level associated with the employee based on the role and the line of business;

comparing the access level associated with the employee to access levels associated with other employees, within the plurality of employees, in a same role and a same line of business as the employee; and modifying the access level associated with the employee based on the comparison.

19. The one or more non-transitory computer-readable media of claim 18, wherein the analyzing the test data comprises:

comparing the test data to employee activity associated with other employees, within the plurality of employees, in the same role and the same line of business as the employee;

determining whether the test data matches the employee activity associated with the other employees, within the plurality of employees, in the same role and the same line of business as the employee; and determining:
based on the test data matching the employee activity associated with the other employees, that the test data is not an outlier; or based on the test data failing to match the employee activity associated with the other employees, that the test data is an outlier.

20. The one or more non-transitory computer-readable media of claim 15, wherein the memory stores additional computer-readable instructions that, when executed by the processor, further cause the computing device to:

implement, based on the indication from the employee computing device, the modified employee control thresholds; and initiate, based on the notification indicating the test data does not comply with the employee control thresholds associated with the employee, a security review of the employee activity associated with the employee.

* * * * *